Figure 3:
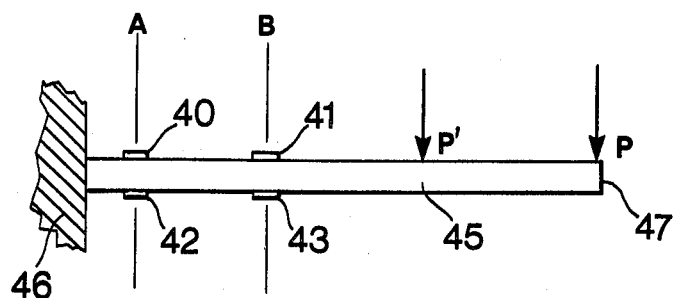

United States Patent [19]
Elder

[11] 4,407,380
[45] Oct. 4, 1983

[54] WEIGHING DEVICE FOR FLUENT MATERIAL

[76] Inventor: David I. M. Elder, Little Barn, Manor La., Great Chesterford, Saffron Waldon, England

[21] Appl. No.: 272,394

[22] Filed: Jun. 10, 1981

[30] Foreign Application Priority Data

Jun. 17, 1980 [GB] United Kingdom ............... 8019809

[51] Int. Cl.$^3$ ........................................... G01G 11/04
[52] U.S. Cl. .................................. 177/145; 177/211; 177/229; 222/55
[58] Field of Search .............. 177/211, 229, 16, 145; 222/55; 73/862.65, 861.73

[56] References Cited

U.S. PATENT DOCUMENTS

| | | | |
|---|---|---|---|
| 1,883,017 | 10/1932 | Sholtz | 177/16 X |
| 2,047,203 | 7/1936 | Henson | 177/16 X |
| 2,872,074 | 2/1959 | Birtwell | 222/55 |
| 3,439,761 | 4/1969 | Laimins | 177/16 X |
| 3,576,128 | 4/1971 | Lockery | 177/211 X |
| 4,157,661 | 6/1979 | Schindez | 73/861.73 |

FOREIGN PATENT DOCUMENTS 859630 1/1961 United Kingdom .
348888 8/1972 U.S.S.R. .

Primary Examiner—Joseph W. Hartary
Attorney, Agent, or Firm—Gifford, VanOphem, Sheridan & Sprinkle

[57] ABSTRACT

A weighing device for fluent materials, for example grain, enables a flow of the material to be weighed.

The device includes a sensor member with an inclined surface over which the flow passes. The member is supported in cantilever and the force on the member due to the flow of material is sensed by sensing means.

The sensing means senses the bending forces, or other physical characteristic of the member at two positions along the member and the resulting signals are compared to give an output signal corresponding to the weight of material passing over the member.

The sensing means may be strain gauges arranged in a Wheatstone bridge circuit the output from which is passed to integrating means.

8 Claims, 5 Drawing Figures

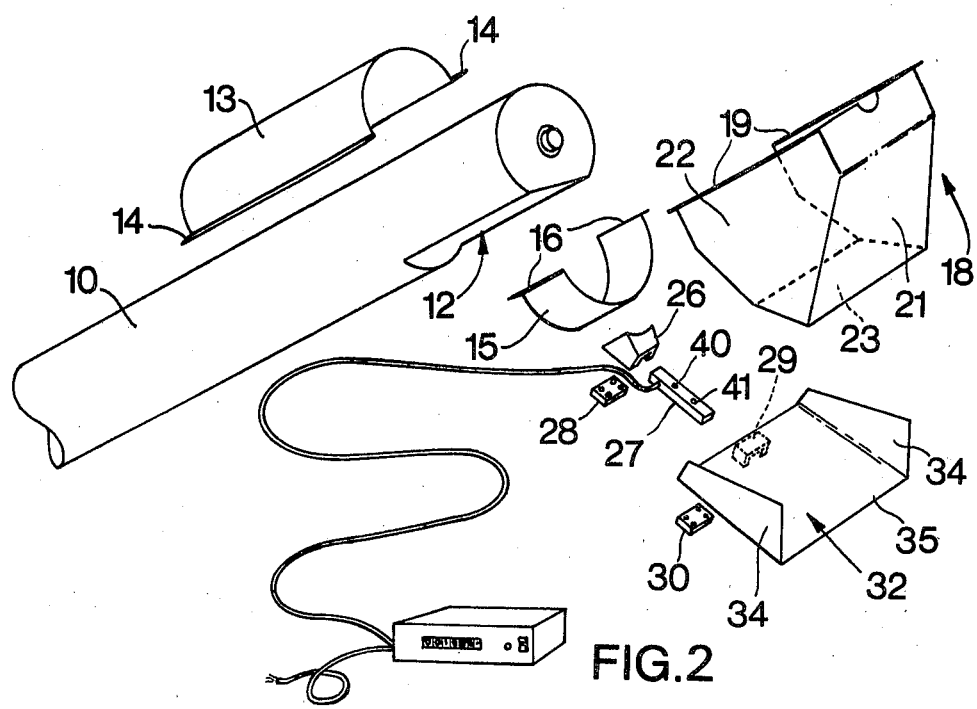
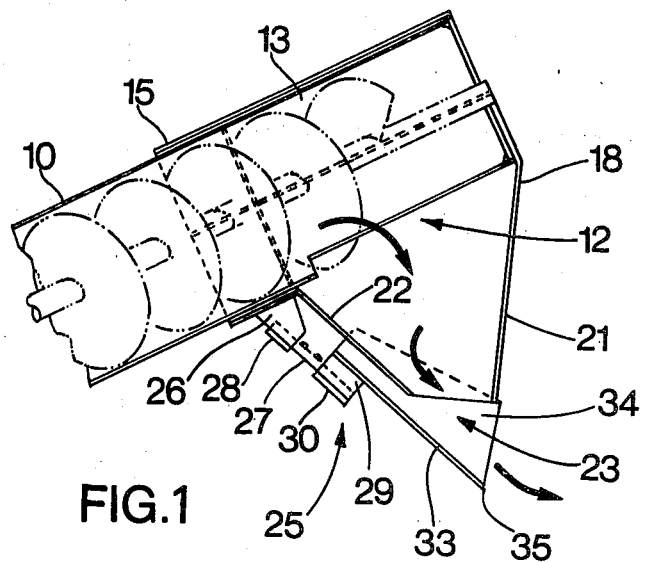

WEIGHING DEVICE FOR FLUENT MATERIAL

This invention relates to a weighing device for fluent material and in particular, but not exclusively, for particulate material such as grain.

It is frequently desirable to determine the cumulative weight of material being conveyed but usually this is only possible by weighing the material in batches, by determining the volume of material, by taking periodic weighings of the conveyor carrying the material, or by other means which are either discontinuous or require a characteristic of the material, such as specific gravity, to be known in order to compute the weight. Thus there exists a need for a simple weighing device which is capable of giving a continuous indication of the weight of material flowing along a conveyor.

It has been proposed, for example in U.S. Pat. No. 2,872,074, to control a rate of feed of material by measuring a flow of the material using a deflecting member interposed in the flow. The deflecting member is associated with sensing means which can measure the force imposed on the deflecting means by the flow of material. The sensing means may be a strain gauge arranged to control the rate of feed in accordance with a predetermined setting. Alternatively the sensing means may sense a pivoting action of the deflecting member as described in British Patent Application No. 2,019,914 using a transducer. However in each case the weight of material detected by the sensing means may be affected by the position at which the material engages the deflecting member and other external factors and the accuracy of the weight determination system is not high enough for many weighing applications, particularly those in which the aggregate weight of material is required.

An object of the invention is to provide a weighing device suitable for the continuous weighing of fluent material which device is of simple and robust construction.

According to the invention a device for weighing a flow of fluent material comprises a sensor member having a surface inclined to the horizontal and over which surface said flow of material passes, feed means for feeding material to said surface, support means for supporting the sensor member, and sensing means for sensing changes in a physical characteristic of the sensor member arising out of the force imposed on the sensor member by the material flowing over said member, wherein the support means supports the sensor member in cantilever and the sensing means senses said physical characteristic at at least two positions spaced different distances along the sensor member from the support means, further comprising means arranged to receive signals from the sensing means corresponding to the force at said two positions, compare the signals and provide an output signal corresponding to the weight of material engaging the sensor member.

Preferably the sensing means includes strain gauges arranged to sense the bending moment on the sensor member at said two positions.

The sensor member may include a cantilever beam carrying a member defining said surface, the beam being supported by the support means at one end and the sensing means being arranged to determine the tensile forces in the beam at two positions along the beam, said two positions being spaced different distances along the beam from the support means and the signals from the sensing means may be compared by a bridge circuit which provides an output signal for integrating means.

Conveniently the feed means is spaced above the inclined surface so that the material falls under gravity onto said surface from a predetermined height.

The receiving surface of the sensor member is conveniently arranged at an acute angle to the horizontal to enable the material to run off the member after it is received onto the member, and the higher end of the receiving surface is at the supported end of the member.

Figure 4:
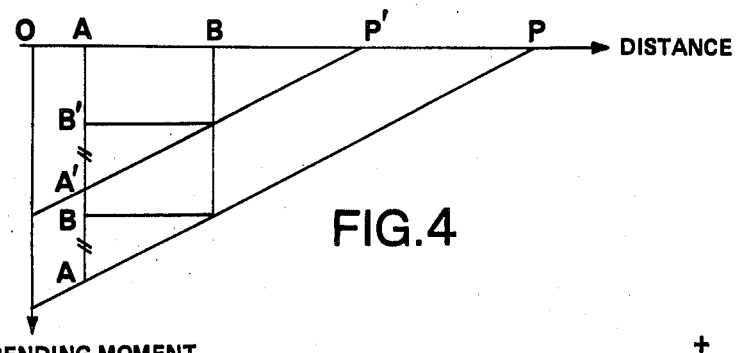
Figure 5:
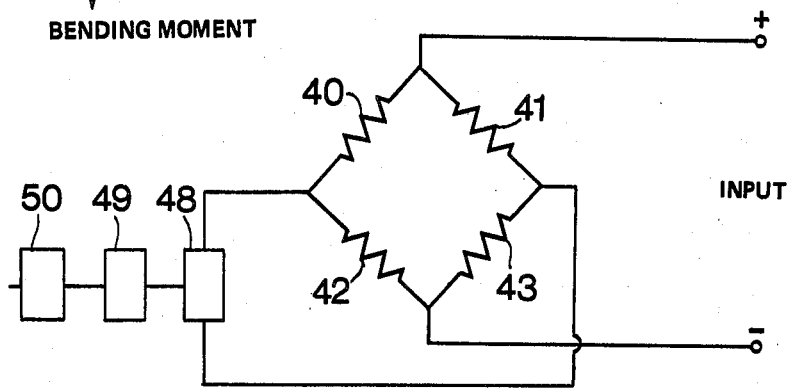

Further features of the invention will appear from the following description of an embodiment of the invention given by way of example only and with reference to the drawings, in which:

FIG. 1 is a cross-section of the weighing device applied to the weighing of grain discharged from a combine harvester, FIG. 2 is a perspective view of the device of FIG. 1 before assembly, FIG. 3 is a diagrammatic view of part of the device of FIGS. 1 and 2, FIG. 4 is a schematic diagram of the forces involved in the device of FIG. 3, and FIG. 5 is a circuit diagram for the electrical circuit of the weighing device.

Referring to the drawings and firstly to FIGS. 1 and 2, a weighing device arranged to weigh grain discharged from a combine harvester is shown. The combine harvester has the conventional inclined discharge spout 10 in which an auger conveyor rotates to convey the grain up along the spout to an opening 12 through which the grain usually is directly discharged. In this case to provide for controlled discharge of the grain the spout is provided with a hood assembly.

The assembly includes a semi-cylindrical member 13 located over the end of the spout 10 and having longitudinally arranged flanges 14 along its edges. At one end of the member 13 is located a semi-cylindrical clamping member 15 having flanges 16 secured by bolts to the flanges 14 of member 13. A hood member 18 is secured to the member 13 towards the upper end of the spout 10 by flanges 19 along edges of the hood member 18 which cooperate with the remaining portions of the flanges 14 of the member 13.

The hood member 18 provides surfaces 21 and 22 against which grain discharged from the spout impinges to take out the horizontal component of velocity of the grain. The grain passes from the hood through a rectangular opening 23 lying generally horizontally and the arrangement is such that grain passing through the opening is travelling in a generally vertically downwards direction.

A sensor member, indicated generally by 25, is carried on the clamping member 15 and includes a clamping block 26 in which one end of a bar 27, constituting a cantilever beam, is secured by a clamping plate 28. The other end of the bar 27 is secured in a further block 29 by a further clamping plate 30 and the block 29 is rigidly attached to the underside of a sensor plate 32.

The sensor plate 32 provides a receiving surface 33 on which the grain from the opening 23 falls and the plate 32 is rectangular and of somewhat larger dimensions than the opening 23. The plate 32 is inclined downwardly away from its supported edge and has upturned side edges 34 to constrain the grain to pass over the receiving surface 33 and fall off at the free edge 35 of the plate 32. The angle of the receiving surface of the plate 32 to the horizontal is dependent on the particular installation and material to be weighed but can be of the order of 40°, as will be explained.

The bar or cantilever beam 27 is put under a bending moment by the grain falling onto the sensor plate 32 and to detect the bending moment the beam 27 is fitted with strain gauges 40, 41, 42 and 43.

For a better understanding of the operation of the strain gauges we now refer to FIGS. 3, 4 and 5. In FIG. 3 the beam 27 and sensor plate 32 are denoted schematically by 45 and the support for the end of the beam by 46. It will be seen that two strain gauges 40 and 41 are located on top of the beam 45 spaced from the support 46 and the strain gauge 41 is spaced further from the support 46 than the strain gauge 40 in the direction away from the support 46 and towards the free end of the beam 47. Directly underneath the gauges 40 and 41 and on the opposite side of the beam 45 are the two further strain gauges 42 and 43 respectively. Thus the strain gauges 40 and 41 determine the tensile forces at two positions along the upper side of the beam and the strain gauges 42 and 43 determine the corresponding compressive forces on the opposite side of the beam 45. It will be seen that the beam 45 is constructed so that bending forces occur at the positions of the gauges 40, 42 and 41, 43.

FIG. 4 shows diagrammatically the effect of applying a bending force of the same magnitude at different positions along the beam. If the force is applied at P at the free end of the beam 45 the difference between the bending force detected by gauge 41 and that detected by the gauge 40 is the same as if the same force were applied at P' nearer the support 46. In the force diagram of FIG. 4 this is illustrated by the distance AB derived from the force at P being the same as the distance A'B' for the force at P'. Thus the effect of different bending forces being created depending on the distance from the support 26 at which the grain lands on the beam 45 is compensated for by the use of two strain gauges detecting the bending forces at different positions along the beam.

In addition to the two strain gauges 40 and 41 to detect the tensile forces in the beam, the two gauges 42 and 43 detect the compression forces in the opposite side of the beam. The strain gauges 40, 41, 42, and 43 are arranged in a Wheatstone bridge circuit as shown in FIG. 5 and in this way the gauges 40 and 42 add the numerical strains detected by each together, and the numerical strains detected by gauges 41 and 43 are added together and subtracted from the sum of 40 and 42. This characteristic is brought about by the known characteristics of such a Wheatstone bridge circuit in which resistive changes in adjacent arms of the bridge circuit are algebraically subtractive whereas resistive changes in opposite arms of the bridge circuit are algebraically additive.

Accordingly, as in the illustrated arrangement, when material impinges on the beam at different distances from the beam support 46 the output signal from the strain gauges is independent of the distance at which the force acts and detects the weight of material wherever the material strikes the sensor plate 32.

The arrangement also provides temperature compensation in the event of temperature changes because a change in temperature equally affects the resistances of the gauges 40 and 41 as it does those of gauges 42 and 43.

The output voltage from the Wheatstone bridge circuit which is directly proportional to the difference in strain between the two gauging positions passes to an amplifier 48 and to an integrating device 49. The integrating device 49 receives a signal related to the weight of material falling on the sensor plate 32 and this signal is integrated in relation to time to provide an output signal which is fed to a digital unit 50 giving a continuous indication of the aggregate weight of material which has fallen on the plate since initiation of a weighing operation. The circuit also includes damping means (not shown) whereby unwanted signals, for example those due to vibration of the spout, are removed from the signal output.

It will be seen that the grain impinging on the sensor plate 32 has fallen through a short vertical distance insufficient for the grain to have reached terminal velocity and therefore unaffected by the aerodynamic shape of the individual grains. Consequently the forces of impact of the grain on the plate 32 is directly proportional to the mass of grain passing over the plate.

Moreover the plate 32 is inclined at a selected angle to the horizontal to allow the grain to flow off the plate continuously so that the grain which falls onto the plate at its upper end will apply a smaller impact force than grain travelling a further distance to land on the power portion of the plate. However by angling the plate 32 correctly the extra force on the plate produced during flow of material off the plate from said upper end compensates for the reduced impact force of this material.

Although the invention has been described in relation to the weighing of grain from a combine harvester it will be appreciated that it can be applied to many other fluent materials which are capable of falling onto and flowing off a sensor plate or other receiving member.

The device can give an indication of the continuous aggregate total of material passing over the device or can indicate instantaneous rates of flow of the material. Other controls can be incorporated to give a desired rate of flow or to cut off flow after a predetermined weight of material has passed over the device.

In the illustrated embodiment there is described sensing means which senses the tensile and compressive forces arising in the cantilever beam due to the bending moment on the beam when the material engages the sensor member. It will be appreciated, however, that the sensing means may sense another physical characteristic arising out of the force on the sensor member. For example the sensor member may sense the deflection of the cantilever beam. Moreover the tensile forces may be sensed by other than strain gauges.

It will also be appreciated that instead of using a Wheatstone bridge circuit to compare the output signals of the sensing means the comparison may be made with other means such as an electronic comparator. In each case however it is desirable that the signals corresponding to the tensile forces at the two positions along the beam be deducted from one another to generate an output signal in order to provide an output signal which is independent of the position at which the force acts on the beam.

What I claim as my invention and desire to secure by Letters Patent of the United States is:

1. A device for weighing a flow of fluent material, comprising a sensor member having a surface inclined to the horizontal; feed means for feeding said flow of material to said surface; support means for supporting the sensor member and including a cantilever beam supported at one end and lying in a plane substantially parallel to the plane of the sensor member; sensing means including strain gauge means arranged to sense the bending moment in the beam; and comparison means arranged to receive signals from the sensing means corresponding to said bending moment, compare the signals and provide an output signal corresponding to the weight of material engaging the sensor member, the sensor member being arranged so that the flow of material from the feed means passes over said surface after a fall under gravity from the feed means is interrupted by said surface, and the material is discharged from the lower end of said surface, and the arrangement of the beam is such that the bending moment sensed corresponds to the reaction developed in the sensor member in a direction at right angles to the sensor member surface.

2. A device according to claim 1 wherein the feed means is disposed above the sensor member surface and the feed means includes a feed surface inclined such that the surface subtends an acute angle with respect to the sensor member surface, the feed surface having a lower end spaced above the sensor member surface and over a lower end of the sensor member surface, material passing over the feed surface, off its lower end, and falling under gravity towards the sensor member surface, and the flow of material from the feed surface passing over said sensing member surface after said fall is interrupted by the sensor member surface and the material is discharged from the lower end of said sensor member surface.

3. A device for weighing a flow of fluent material, comprising a sensor member having a surface inclined to the horizontal and with a lower end; feed means disposed above the sensor member surface for feeding said flow of material to said surface, the feed means including a feed surface with a lower end and inclined such that the surface subtends an acute angle with respect to the sensor member surface, and the material passing over the feed surface, off its lower end and falling under gravity towards the sensor member surface, said lower end of the feed surface being disposed over the lower end of the sensor member surface; support means for supporting the sensor member and including a cantilever beam supported at one end; sensing means including strain gauge means arranged to sense the bending moment in the beam, and comparison means arranged to receive signals from the sensing means corresponding to said bending moment, compare the signals and provide an output signal corresponding to the weight of material engaging the sensor member, the sensor member and the feed means being arranged so that the flow of material from the feed means passes over said sensor member surface after said fall under gravity is interrupted by the sensor member surface and the material is discharged from the lower end of said surface.

4. A device according to claim 3 wherein the feed means includes conveyor means which directs the fluent material towards said feed surface.

5. A device according to claim 3 wherein the sensor member surface is at substantially 40° to the horizontal.

6. A device according to claim 3 wherein the cantilever beam lies in a plane parallel to the plane of the sensor member such that the bending moment sensed corresponds to the reaction developed in the sensor member in a direction at right angles to the sensor member surface.

7. A device according to claim 3 wherein the fluent material is grain and the device is fitted to the discharge spout of a combine harvester to determine the weight of crop discharged, the spout including an auger conveyor which conveys the crop to the feed means.

8. A device according to claim 3 wherein the feed means is spaced above the sensor member surface a distance insufficient for the material to have reached its terminal velocity in falling under gravity towards said surface.

* * * * *